United States Patent Office

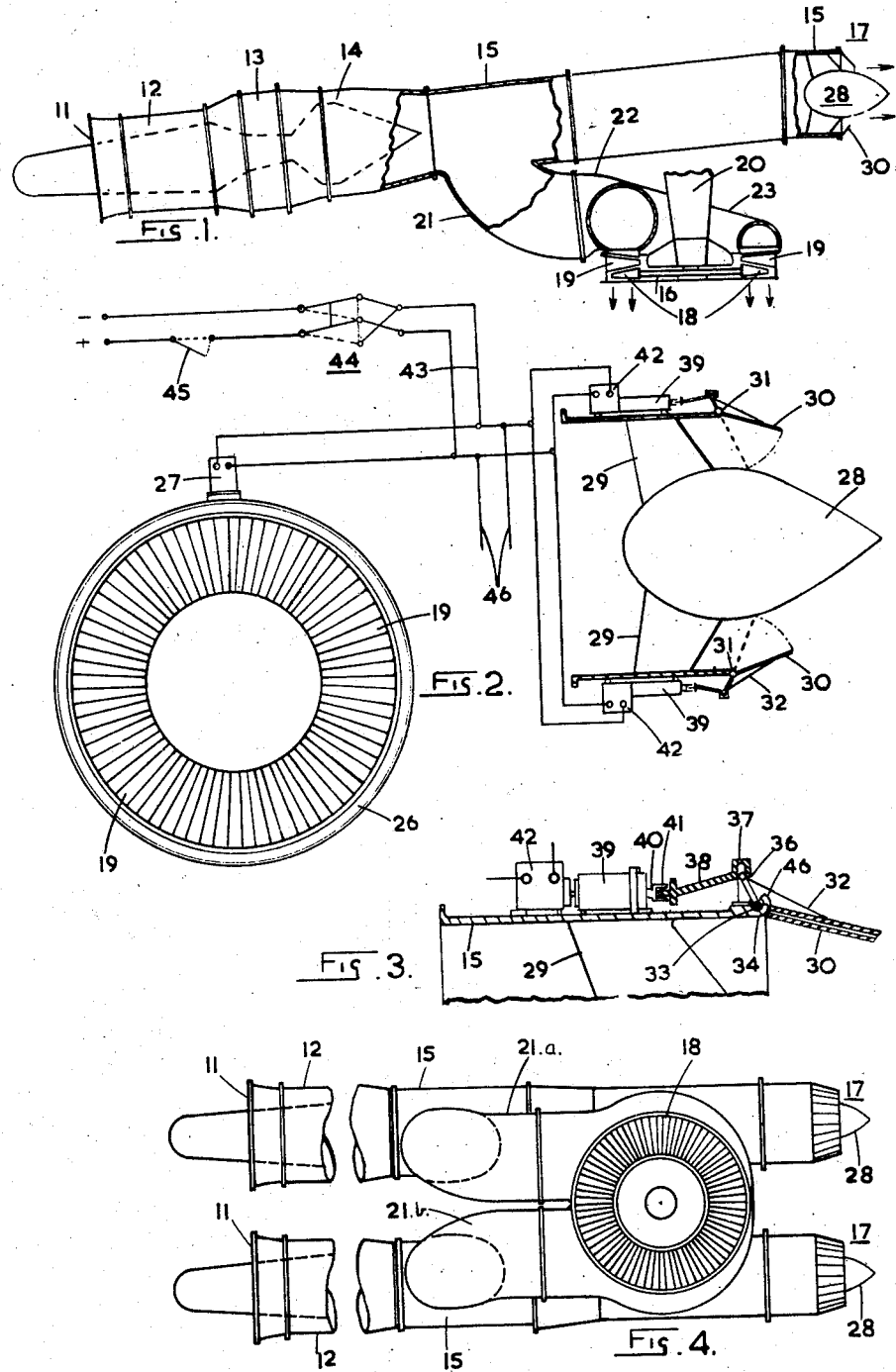
April 30, 1963    H. S. RAINBOW    3,087,691
AIRCRAFT UTILIZING PLURAL JET ENGINES CONNECTABLE
TO DRIVE TURBINE DRIVEN LIFT ROTORS
Original Filed March 20, 1957    2 Sheets-Sheet 1

3,087,691
Patented Apr. 30, 1963

3,087,691
AIRCRAFT UTILIZING PLURAL JET ENGINES CONNECTABLE TO DRIVE TURBINE DRIVEN LIFT ROTORS
Horace Sinclair Rainbow, St. Ives, England, assignor, by mesne assignments, to Bristol Siddeley Engines Limited, Bristol, England, a British company
Continuation of application Ser. No. 647,341, Mar. 20, 1957. This application Nov. 24, 1961, Ser. No. 157,032
Claims priority, application Great Britain Mar. 28, 1956
3 Claims. (Cl. 244—23)

The invention is a continuation of Serial No. 647,341, filed by me on March 20, 1957, now abandoned, and relates to a power plant including a plurality of turbine engines, each having an effluent pipe, leading to a thrust nozzle and from which the gas can be diverted to supply a free turbine to provide power, for example, for driving a vertical take-off fan in a duct extending between top and bottom surfaces of a part of an aircraft.

It is essential in a vertical take-off aircraft that provision should be made to provide sufficient power to drive the fan to provide the necessary lift, in the event of engine failure. The invention seeks to comply with this safety requirement by providing a plurality of turbine engines for supplying gas to separate admission sectors of a free power turbine, whereby if an engine should fail, during vertical take-off, the remaining engine or engines will supply gas to the respective sectors, thereby providing sufficient power to drive the fan.

Another feature of the invention is to avoid undesirable changes in the operating conditions of an engine during the intermediate period between operation of the engine solely as a thrust producer, when all the gas passing through the effluent pipe leaves through the thrust nozzle associated therewith, and operation of the engine to drive the free power turbine only, when all the gas passing to the effluent pipe is diverted to enter the free power turbine.

Accordingly, one object of the invention is to provide a power plant including a plurality of turbine engines, each having an effluent pipe and a thrust nozzle at the outlet of said effluent pipe; a free power turbine having at least two separate admission sectors; means extending co-axially of said free power turbine and rotatable thereby, to provide shaft power at a position remote from said free power turbine; at least two branch ducts, each for diverting gas from a different effluent pipe to a respective admission sector; an exhaust outlet from said free power turbine, and means for controlling said diversion of gas.

Another object of the invention is to provide a power plant including a plurality of turbine engines, each having an effluent pipe and a thrust nozzle at the outlet of said effluent pipe; a free power turbine having a plurality of separate admission sectors corresponding in number to said turbine engines and together forming a substantially complete annulus; means extending co-axially of said free power turbine and rotatable thereby, to provide shaft power at a position remote from said free power turbine; a set of adjustable inlet guide vanes in each sector of said free power turbine; a branch duct for diverting gas from each said effluent pipe to a respective admission sector; an exhaust outlet from said free power turbine; means for varying the effective outlet area of each of said thrust nozzles; means for adjusting said inlet guide vanes of each set to vary the effective area of admission to the respective sectors of said free power turbine and coupling means between each said thrust nozzle area-varying means and said means for adjusting said inlet guide vanes, such that for each turbine engine the effective outlet area of said thrust nozzle, on the one hand, and the effective area of admission to the respective sector of said free power turbine, on the other hand, are variable simultaneously and inversely for effecting the said gas diversion such that the instantaneous sum of the mass flows through said thrust nozzle and said admission sector is kept substantially constant.

Yet another object of the invention is to provide a vertical take-off aircraft including a plurality of turbine engines each having an effluent pipe and a thrust nozzle at the outlet of said effluent pipe; a free power turbine having a plurality of separate admission sectors corresponding in number to said turbine engines and a downwardly directed exhaust outlet; a ducted fan arranged to provide a downwardly directed airstream; drive shafting connecting the free power turbine to the ducted fan; a branch pipe for conveying gas from each said effluent pipe to a respective admission sector; and means for controlling the diversion of gas from each said effluent pipe through the associated branch pipe to the associated admission sector.

In the accompanying drawings, which illustrate the application of the invention to a power plant for a jet-propelled aircraft provided with a vertical-lift fan to be driven from a free power turbine of the power plant:

FIGURE 1 is a diagrammatic side view and part section of part of the aircraft power plant;

FIGURE 2 is a diagram illustrating one way in which the areas of an admission sector of the free power turbine and of the thrust nozzle of the associated effluent pipe are varied inversely;

FIGURE 3 is an enlarged diagrammatic view, partly in section, of part of the thrust nozzle of one engine and of the means for varying its area;

FIGURE 4 is a diagrammatic underside view of the aircraft power plant; and

Figure 5:
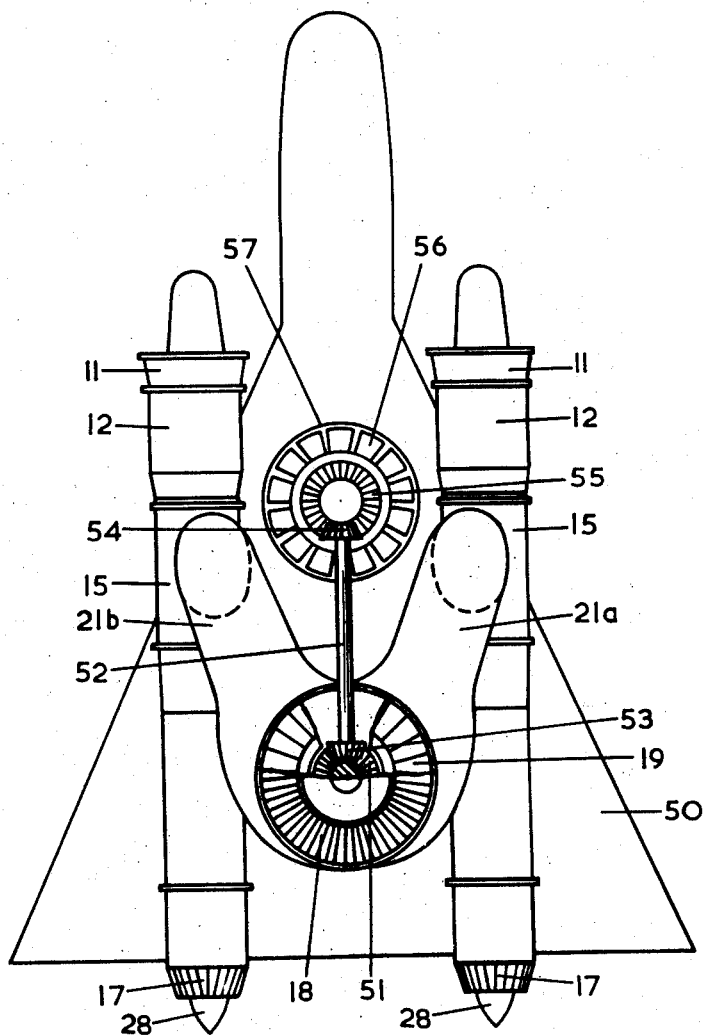
FIGURE 5 is a diagrammatic underside view of a power plant similar to that shown in FIGURES 1 and 4 in a vertical take-off aircraft.

FIGURES 1 and 4 show a power plant having a pair of gas turbine engines each having an annular air intake 11 for a compressor in the zone marked 12, the compressor feeding to one or more combustion chambers, in the zone marked 13, which provide propulsion gas for a turbine, connected to drive the compressor, in the zone marked 14. This propulsion gas, after having passed through the turbine, enters the effluent pipe 15 from which it is used either to drive a single free power turbine 16 for driving a lift fan (see FIGURE 5) of the aircraft, or to provide a propulsion jet at the thrust nozzle, generally indicated at 17, at the outlet end of the effluent pipe, or to perform both of these functions simultaneously.

The free power turbine rotor blades are shown at 18 and the inlet nozzle vanes at 19. A part of the means for supporting the free power turbine from the aircraft, and for supporting the drive to the lift fan, is shown at 20. The free power turbine is fed from the effluent pipes of the two engines through branch ducts 21a and 21b respectively (see FIGURE 4) into separate semi-annular admission sectors, of the free power turbine, of which sectors one is shown at 22, 23 in FIGURE 1, to make the propulsion gas available to respective sets of the inlet nozzle vanes at opposite sides of a diameter of the free power turbine.

The free power turbine is one having a variable admission and, for example, it can be of the kind in which the inlet nozzle vanes are pivotally supported at their ends so that the vanes of each set can be turned serially from a fully opened position to a fully closed position by the interaction of followers, eccentric with respect to the vane pivot axes, with a cam ring 26 (see FIGURE 2) which is rotatable through gearing driven from a reversible electric motor 27. The vanes of both sets are shown in their fully closed positions in which none of the propulsion gas is supplied to the free power turbine rotor.

A bullet 28 (i.e., a member which is of aerofoil form in a side view, but circular in cross-section) is held co-axially within the effluent pipe outlet by radial, streamlined struts 29, and the outer periphery of the said outlet is formed by a circular arrangement of flaps 30 (only two being shown) which are narrow in the circumferential direction of the outlet and separately supported on pivots 31 which are parallel to tangents of the outlet.

These flaps and the bullet are for defining the thrust nozzle at the outlet of the effluent pipe, and the flaps are movable, by means presently to be described, from the position shown, in which they define the outer periphery of the thrust nozzle at its maximum area, to a position in which their downstream edges effect a seal with the bullet to close the said thrust nozzle. The longitudinal edges of alternate flaps are formed with grooves sealingly to receive the longitudinal edges, which are not grooved, of the intermediate flaps whereby to maintain a seal between them in all positions of the flaps.

As will best be seen in FIGURE 3, each flap is formed with a stiffening spine 32, and its pivot (31) comprises a laterally-extending pin 33 which is held in a groove 34 of the effluent pipe by a retaining finger 35 fast with the pipe. The extending end of the spine also has a laterally-extending pin 36 which is engaged in a channel 37 of a ring 38 co-axially outside the effluent pipe. At equally-spaced intervals around the circumference of the respective effluent pipe, there is supported a plurality of screw jacks 39 of which the coacting screws have extensions 40 with pivotal connections 41 to the ring 38. These screw jacks are driven by respective reversible electric motors 42 which are connected in parallel with each other and with the electric motor 27. The supply lines for the motors are indicated at 43, and they include a change-over switch 44 and a control switch 45.

With the switch 44 set appropriately, closing the switch 45 simultaneously energises the motors 27 and 42. This simultaneously causes the motor 27 to drive the ring 26 for moving the vanes 19 of each set serially from one extreme position to the other (e.g., from the fully open, to the fully closed position), and the motors 42 to displace the ring 38 to cause the flaps 30 to move from the opposite extreme position to the other (e.g., from the fully closed, to the fully open position). Thus, for example, as an increasing number of the vanes 19 are moved to the closed position to reduce the lift provided by the fan, the flaps move outwardly to widen the annular outlet from the effluent pipe.

The flaps of the two thrust nozzles 17 are driven synchronously from one extreme position to the other, for which purpose the electric motors for driving the screw jacks which displace the flap-operating ring 38 of one of the turbine engines are fed in parallel with those of the other turbine engine, for example, through the leads indicated at 47 in FIGURE 2.

The arrangement is such that during a change-over, say, from maximum lift with no forward propulsion, to zero vertical lift with maximum forward propulsion, the instantaneous sum of the thrust nozzle area of the engines and the turbine admission areas is kept substantially constant so that the sum of the mass flows of the propulsion gas through the free turbine admission sectors and through the annular area between the flaps 30 and bullet 28 of each engine is also kept substantially constant and equal to the mass flow output of the turbine engine, whereby the change-over is effected smoothly and without varying the back pressure acting on the turbine.

If it is desired to provide the aircraft with vertical lift and forward propulsion, the switch 45 is operated to inch the motors 27 and 42 until the desired extents of free turbine admission and thrust nozzle areas are obtained.

It will be seen from FIGURE 3 that the spines 32 are arcuately gapped at 46 to provide clearance for the pivotal movement of the flaps.

Referring to FIGURE 5, a power plant similar to that shown in FIGURES 1 and 4 is shown mounted in a vertical take-off aircraft 50. Parts also appearing in FIGURES 1 and 4 are shown by like reference numerals. The rotor blades 18 of the free power turbine are arranged to rotate a bevel gear wheel 51, which drives a shaft 52 through a bevel gear wheel 53. The shaft 52 drives, through another pair of bevel gear wheels 54, 55, the rotor blades 56 of a lift fan mounted in a duct 57 extending from top to bottom surfaces of the aircraft. In order to illustrate the mechanical drive, parts of the free power turbine are shown broken away. In this way the free power turbine drives the lift fan, thereby enabling the aircraft to take-off vertically. As aforesaid, the invention provides the safety feature that if one of the engines should fail when the gases from the engines are being diverted through the branch ducts 21a or 21b, the turbine admission sector associated with the other engine will still receive its full flow of gas and therefore the turbine will still provide sufficient shaft power to drive the fan blades 56.

What I claim as my invention and desire to secure by Letters Patents of the United States is:

1. A vertical take-off aircraft including a plurality of turbine engines, each having an effluent pipe and a rearwardly-directed thrust nozzle at the outlet of said effluent pipe; a free power turbine having a plurality of separate admission sectors, corresponding in number to said turbine engines and together forming a substantially complete annulus; a downwardly-directed exhaust outlet from said free power turbine; a set of adjustable inlet guide vanes in each sector of said free power turbine; a branch duct for diverting gas from each said effluent pipe to a respective admission sector; means for varying the effective outlet area of each of said thrust nozzles; and means for adjusting said inlet guide vanes of each set to vary the effective area of admission to the respective sectors of said free power turbine; a ducted fan arranged to provide a downwardly-directed airstream, and drive shafting connecting the free power turbine to the ducted fan.

2. A vertical take-off aircraft including a plurality of turbine engines, each having an effluent pipe and a rearwardly-directed thrust nozzle at the outlet of said effluent pipe; a free power turbine having a plurality of separate admission sectors corresponding in number to said turbine engines and together forming a substantially complete annulus; a downwardly-directed exhaust outlet from said free power turbine; a set of adjustable inlet guide vanes in each sector of said free power turbine; a branch duct for diverting gas from each said effluent pipe to a respective admission sector; means for varying the effective outlet area of each of said thrust nozzles; means for adjusting said inlet guide vanes of each set to vary the effective area of admission to the respective sectors of said free power turbine; coupling means between each said thrust nozzle area-varying means and said means for adjusting said inlet guide vanes, such that for each turbine engine the effective outlet area of said thrust nozzle, on the one hand, and the effective area of admission to the respective sector of said free power turbine, on the other hand, are variable simultaneously and inversely for effecting the said gas diversion such that the instantaneous sum of the mass flows through said thrust nozzle and said admission sector is kept substantially constant; a ducted fan arranged to provide a downwardly-directed airstream, and drive shafting connecting the free power turbine to the ducted fan.

3. A vertical take-off aircraft including a plurality of turbine engines, each having an effluent pipe and a rearwardly-directed thrust nozzle at the outlet of said effluent pipe; a free power turbine having a plurality of separate admission sectors corresponding in number to said turbine engines and together forming a substantially complete annulus; a downwardly-directed exhaust outlet from said free power turbine; a set of adjustable inlet guide vanes in each sector of said free power turbine; a branch duct for diverting gas from each said effluent pipe to a respective admission sector; means for varying the effective outlet area of each of said thrust nozzles in unison; means for adjusting said inlet guide vanes of each set to vary the effective area of admission to the respective sectors of said free power turbine; coupling means between said thrust nozzle area-varying means and said means for adjusting said inlet guide vanes, such that the effective outlet areas of said thrust nozzles, on the one hand, and the effective area of admission to said free power turbine, on the other hand, are variable simultaneously and inversely for effecting the said gas diversion such that the instantaneous sum of the mass flows through said thrust nozzles and the free power turbine is kept substantially constant; a ducted fan arranged to provide a downwardly-directed airstream, and drive shafting connecting the free power turbine to the ducted fan.

References Cited in the file of this patent
UNITED STATES PATENTS

| | | |
|---|---|---|
| 2,601,194 | Whittle | June 17, 1952 |
| 2,625,789 | Starkey | Jan. 20, 1953 |
| 2,884,633 | Stahmer | Apr. 28, 1959 |
| 2,899,149 | Breguet | Aug. 11, 1959 |
| 2,944,393 | Fox | July 12, 1960 |